United States Patent [19]

Ohmura

[11] 4,045,902
[45] Sept. 6, 1977

[54] FASTENING DEVICE FOR A REEL ON FISHING RODS

[75] Inventor: Ryuichi Ohmura, Shizuoka, Japan

[73] Assignee: Fuji Kogyo Co., Ltd., Japan

[21] Appl. No.: 673,542

[22] Filed: Apr. 5, 1976

[30] Foreign Application Priority Data

July 17, 1975 Japan .............................. 50-99946[U]

[51] Int. Cl.² .............................................. A01K 87/06
[52] U.S. Cl. ........................................ 43/22; 403/261; 403/373
[58] Field of Search .......................... 43/22; 24/262 R; 403/365, 373, 261, 256, 259

[56] References Cited

U.S. PATENT DOCUMENTS

| 1,883,041 | 10/1932 | Somers | 43/22 UX |
| 2,292,584 | 8/1942 | Tafarella | 24/262 R |
| 3,364,612 | 1/1968 | Holahan | 43/22 |

FOREIGN PATENT DOCUMENTS

| 959,942 | 6/1964 | United Kingdom | 43/22 |
| 825,673 | 12/1959 | United Kingdom | 43/22 |

Primary Examiner—Andrew V. Kundrat
Attorney, Agent, or Firm—Cantor and Singer

[57] ABSTRACT

A fastening device for stably mounting a fishing reel to a fishing rod by the fastening action of a pair of cooperating sleeves, one fixedly and the other axially slidably mounted on a main cylindrical body which is attached to the fishing rod. The shape of a hood possessed by each sleeve is so improved as to stably and snugly fasten the foot of the reel, allowing very limited horizontal displacement of the reel.

2 Claims, 3 Drawing Figures

U.S. Patent    Sept. 6, 1977    4,045,902
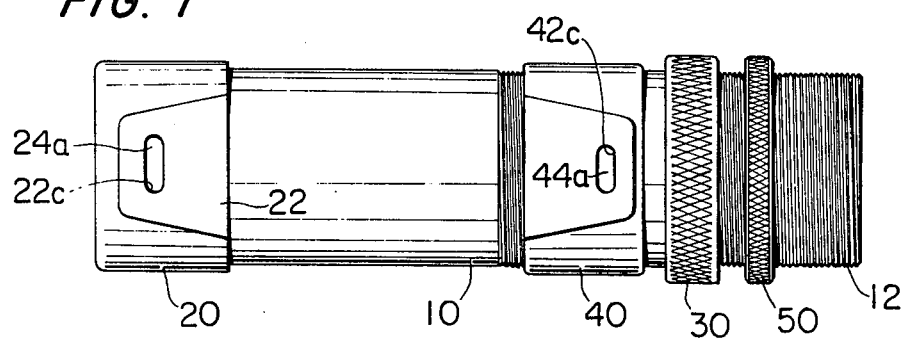
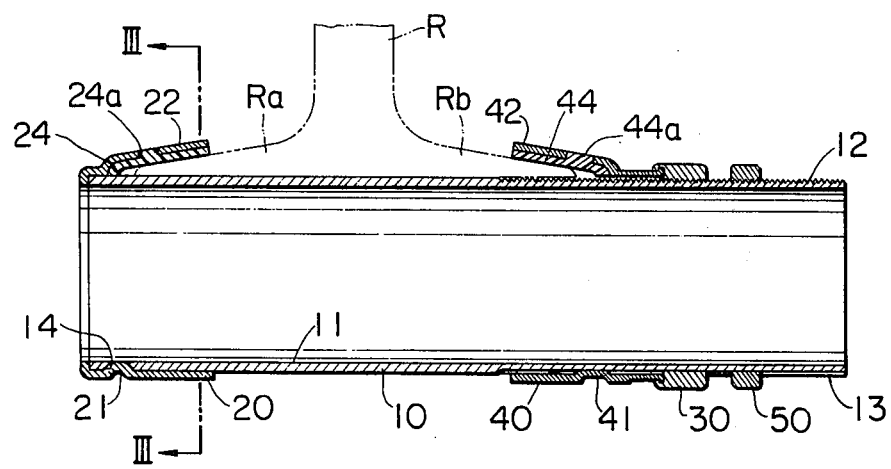
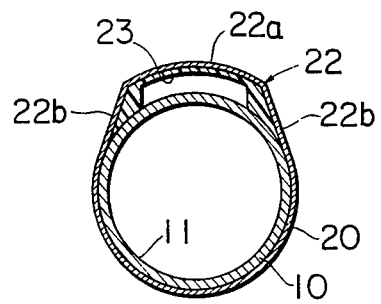

FASTENING DEVICE FOR A REEL ON FISHING RODS

The present invention relates to a fastening device for a reel on fishing rods, more particularly the present invention relates to an improvement of the hood construction of the hoods which receive the feet of a reel of an inversed T-shape.

BACKGROUND OF THE INVENTION

The conventional fastening device for a fishing reel is comprised of a main cylindrical body, a fixed sleeve secured to one end of the cylindrical body, a fastening collar screwed over the other end portion of the cylindrical body and a movable sleeve slidably inserted over the cylindrical body at a position between the fixed sleeve and the fastening collar. The reel is mounted to the device with its feet being securely received in hoods possessed by the sleeves. As is well known, the reel is subjected to various horizontal forces during use and displacement of the reel caused by such force application tends to cause undesirable deformation of the hoods, resulting in less stable mounting of the reel.

It is the object of the present invention to provide a fastening device for a reel which assures reliable and stable holding of the reel over a long period.

SUMMARY OF THE INVENTION

In accordance with the present invention, each of the sleeves, i.e. the fixed and movable sleeves, is provided with a shell-shaped hood on the side on which the reel is to be mounted, the hood is comprised of an arched top wall portion and a pair of plain side wall portions tangentially merging into the circular wall portion of the associated sleeve and a seat piece, which is preferably made of a resilient material such as a synthetic resin, is snugly received within the hood which defines an inner cavity snugly receptive of one foot of the reel.

BRIEF DESCRIPTION OF THE DRAWINGS

Further features and advantages of the present invention will be made in the following description, reference being made to the accompanying drawings in which, FIG. 1 is a top view of an embodiment of the reel fastening device in accordance with the present invention, FIG. 2 is a sectional side view of the device shown in FIG. 1, and FIG. 3 is a section taken along the line III—III in FIG. 2.

DESCRIPTION OF THE PREFERRED EMBODIMENT

In FIGS. 1 and 2, the fastening device in accordance with the present invention includes an axially elongated cylindrical body 10, a fixed sleeve 20 mounted to the cylindrical body 10 at one end thereof, a fastening collar 30 mounted to the cylindrical body 10 near the other end thereof, a movable sleeve 40 mounted to the cylindrical body 10 at a position between the fixed sleeve 20 and the fastening collar 30 and a locking collar 50 mounted to the cylindrical body 10 at a position nearer to the other end thereof than the fastening collar 30.

The cylindrical body 10 is provided with an axially aligned hole 11 for reception of a fishing rod to which the reel is to be attached. An outer thread 12, formed on the periphery of cylindrical body 10 extending from the other end to about the middle of its length and an axially aligned guide groove 13 whose function will later be explained is provided, the groove 13 being formed on the side of the cylindrical body 10 opposite the side in which the reel R, which is shown in phantom in FIG. 2, is to be attached to the fishing rod not shown in the drawing.

The fixed sleeve 20 is provided with an inner projection 21 which is snugly received in a recess 14 formed in the cylindrical body 10 at a position near the one end thereof in order to establish a stable mount of the fixed sleeve 20 to the cylindrical body 10. At the one end of the cylindrical body 10, the inner diameter of the fixed sleeve 20 is equal to that of the axially aligned hole 11 of the cylindrical body 10. On the side on which the reel R is to be mounted to the fishing rod, the fixed sleeve 20 is provided with a shell-shaped hood 22 which defines a hollow cavity 23, in which a seat piece 24 made of a resilient material such as synthetic resin is received.

As shown in FIG. 3, the hood 22 is comprised of an arched top wall 22a and a pair of plain side wall portions 22b which run tangentially to the periphery of the round wall portion of the fixed sleeve 20. The seat piece 24 is so shaped as to come into a snug engagement in the hollow cavity 23 defined by the hood 22 and one foot Ra of the reel R and is provided with a projection 24a which is snugly received in a recess 22c formed through the top wall portion 22a of the hood 22.

On the same side, the movable sleeve 40 is provided with a hood 42 which is substantially the same in design as the hood 22 of the fixed sleeve 22 but the hollow cavity thereof opens towards the opening of the hollow cavity of the hood 22. A seat piece 44 made of a material similar to that of the seat piece 24 is received in the hollow cavity defined by the hood 42. The seat piece 44 is so shaped as to come into a snug engagement in the hollow cavity defined by the hood 42 and the other foot Rb of the reel R and is provided with a projection which is snugly received in a recess 42c formed through the top wall portion of the hood 42. The movable sleeve 40 is further provided with an inner projection 41 which is slidably received in the axially aligned guide groove 13 of the cylindrical body 10. (see FIG. 2) Due to this engagement of the projection 41 with the guide groove 13, turning of the movable sleeve 40 about the axis of the cylindrical body 10 is prevented though the movable sleeve 40 can slide in an axial direction along the cylindrical body 10.

One end of the movable sleeve 40 is in a hooking engagement with the fastening collar 30 while allowing turning of the latter about the axis of the cylindrical body 10. (see FIG. 2) Thus, due to the screw engagement, turning of the fastening collar 30 on the cylindrical body 10 causes axial movement of same and this movement of the fastening collar 30 accompanies concurrent sliding of the movable sleeve 40 on the cylindrical body 10.

With the device of the present invention having the abovedescribed construction, mounting of the reel R to the fishing rod (not shown) is carried out in the following fashion.

The one foot Ra of the reel R is forcedly inserted into the hollow cavity defined by the seat piece 24 of the fixed sleeve 20. Next, the fastening collar 30 is turned so that the collar 30 moves towards the other foot Rb of the reel R until the foot Rb is fully and forcedly received in the cavity defined by the sea piece 44 of the movable sleeve 40.

During use of the reel, forces exert on the reel in various horizontal directions. In accordance with the present invention, the shapes of the hoods 22 and 42 of the fixed and movable sleeves 20 and 40 are so shaped as to fit maximum possible displacement of the feet R*a* and R*b* of the reel R and, in addition, provision of the resilient seat pieces 24 and 44 effectively absorbs displacement of the reel feet R*a* and R*b*. Thus, in accordance with the present invention, drawbacks inevitably possessed by the prior art arrangements are fully eliminated. It is preferable that the sleeves used in the present invention are made of a metallic material so that these elements are resistant against stretch even when they are rather thin in construction.

What is claimed is:

1. In a fastening device for a reel on fishing rods comprising a cylindrical body having an axially aligned hole for receiving the fishing rod, a fixed sleeve mounted to one end of said cylindrical body, a fastening collar screwed over said cylindrical body near the other end thereof and a movable sleeve slidably inserted over said cylindrical body at a position between said fixed sleeve and said fastening collar and co-movable with said fastening collar in the axial direction of said cylindrical body the improvement comprising each of said sleeves being provided with a shell-shaped hood on the side of which said reel is to be mounted, said hood comprising an arched top wall portion and a pair of plain side wall portions tangentially merging into the circular wall portin of said sleeve, a recess formed through said top wall portion of said hood, and a seat piece made of a resilient resin material and having an outer projection snugly received within said hood said outer projection being snugly received within said recess, said seat piece having an inner cavity to snugly receive one foot of said reel, and said cavity having an arcuate top terminating in spaced vertical side walls that are parallel to each other in any plane normal thru said cavity.

2. The fastening device as claimed in claim 1 in which said sleeves and said hood are made of a metallic material.

* * * * *